(12) United States Patent
Van Dijk et al.

(10) Patent No.: US 11,339,067 B2
(45) Date of Patent: May 24, 2022

(54) CONTROLLED SIMULTANEOUS NITRIFICATION AND DENITRIFICATION IN WASTEWATER TREATMENT

(71) Applicant: HASKONINGDHV NEDERLAND B.V., Amersfoort (NL)

(72) Inventors: Edward John Henrik Van Dijk, Amersfoort (NL); Kim Michael Van Schagen, Amersfoort (NL); Anthony Theodoor Oosterhoff, Amersfoort (NL)

(73) Assignee: HASKONINGDHV NEDERLAND B.V., Amersfoort (NL)

(*) Notice: Subject to any disclaimer, the term of this patent is extended or adjusted under 35 U.S.C. 154(b) by 0 days.

(21) Appl. No.: 16/693,113

(22) Filed: Nov. 22, 2019

(65) Prior Publication Data
US 2020/0087181 A1    Mar. 19, 2020

Related U.S. Application Data

(63) Continuation of application No. PCT/EP2018/063559, filed on May 23, 2018.

(30) Foreign Application Priority Data

May 23, 2017  (NL) ..................................... 2018967

(51) Int. Cl.
C02F 3/00      (2006.01)
C02F 3/12      (2006.01)
C02F 3/30      (2006.01)

(52) U.S. Cl.
CPC ............ *C02F 3/006* (2013.01); *C02F 3/1205* (2013.01); *C02F 3/302* (2013.01);
(Continued)

(58) Field of Classification Search
USPC .................................................. 210/614, 739
See application file for complete search history.

(56) References Cited

U.S. PATENT DOCUMENTS

| 5,242,592 A | 9/1993 | Ballnus |
| 5,626,754 A | 5/1997 | Ballnus |

(Continued)

FOREIGN PATENT DOCUMENTS

| CN | 1948184 | 4/2007 |
| FR | 2954306 A1 | 6/2011 |

(Continued)

OTHER PUBLICATIONS

International Search Report and Written Opinion issued in International Application No. PCT/EP2018/063559, dated Jul. 2, 2018.

*Primary Examiner* — Claire A Norris
(74) *Attorney, Agent, or Firm* — Sunit Talapatra; Foley & Lardner LLP

(57) ABSTRACT

A process for controlling the aeration rate during the aerobic phase of a wastewater treatment process is disclosed, which comprises: (a) measuring at moment $t_1$ the ammonium concentration $[NH_4^+]_1$ and nitrogen oxide concentration $[NO_x]_1$ in a mixture of wastewater and microbial sludge; (b) determining a nitrogen oxide target concentration $[NO_x]^F_1$ at the end of the aerobic phase based on at least the current ammonium concentration $[NH_4^+]_1$ and the current $NO_x$ concentration $[NO_x]_1$; (c) determining a setpoint $[NO_x]^{SP}_1$ based on interpolation between $[NO_x]_1$ and $[NO_x]^F_1$; (d) adjusting the aeration rate to minimise error between $[NO_x]_1$ and $[NO_x]^{SP}_1$; and (e) repeating steps (a) to (d) at further moments $t_1$. The invention further concerns a process for the treatment of wastewater, using the process.

21 Claims, 3 Drawing Sheets

(52) U.S. Cl.
CPC .. *C02F 2003/001* (2013.01); *C02F 2209/003* (2013.01); *C02F 2209/04* (2013.01); *C02F 2209/05* (2013.01); *C02F 2209/06* (2013.01); *C02F 2209/14* (2013.01); *C02F 2209/15* (2013.01); *C02F 2209/22* (2013.01); *C02F 2209/44* (2013.01)

(56) References Cited

U.S. PATENT DOCUMENTS

| | | | |
|---|---|---|---|
| 9,302,923 B2* | 4/2016 | Furuya | C02F 3/305 |
| 2010/0065494 A1 | 3/2010 | Lemoine et al. | |
| 2010/0303695 A1* | 12/2010 | Gonzalez Ospina | C02F 3/302 |
| | | | 423/237 |
| 2011/0284461 A1 | 11/2011 | Dimassimo et al. | |
| 2014/0091035 A1 | 4/2014 | Regmi et al. | |
| 2014/0138308 A1 | 5/2014 | Elger et al. | |
| 2014/0263041 A1* | 9/2014 | Regmi | C02F 3/307 |
| | | | 210/605 |
| 2016/0023932 A1* | 1/2016 | Bott | C02F 3/105 |
| | | | 210/630 |

FOREIGN PATENT DOCUMENTS

| WO | WO-2008/046139 | 4/2008 |
|---|---|---|
| WO | WO-2008/141413 A1 | 11/2008 |
| WO | WO-2012/047923 A1 | 4/2012 |
| WO | WO-2015/011213 A1 | 1/2015 |
| WO | WO-2016/131998 A1 | 8/2016 |

* cited by examiner

CONTROLLED SIMULTANEOUS NITRIFICATION AND DENITRIFICATION IN WASTEWATER TREATMENT

CROSS-REFERENCE TO RELATED APPLICATIONS

The present application is a Continuation of International Patent Application No. PCT/EP2018/063559, filed May 23, 2018, and claims the benefit of priority to Netherlands Patent Application Serial No. 2018967, filed on May 23, 2017, the entire contents of which are hereby incorporated by reference.

FIELD OF THE INVENTION

The present invention relates to the field of wastewater treatment, in particular to a process for controlling the aeration rate during the aerobic phase of a wastewater treatment process. The invention further concerns a process for the treatment of wastewater making use of this control and to the use of monitoring of nitrogen oxide and ammonium concentrations for controlling the aeration rate of an aerobic phase during the treatment of wastewater.

BACKGROUND ART

Wastewater treatment typically involves several stages. During primary treatment, heavy solids settle on the bottom of a basin and light oily materials accumulate on the surface of the water. Heavy solids and light oils are removed and the primary-treated wastewater is subjected to secondary treatment, wherein dissolved and suspended biological material is removed. Secondary treatment is typically performed using microorganisms that convert the biological material to sludge. Typically, secondary treatment is combined with tertiary treatment, wherein pollutants such as phosphates and nitrates are removed by microorganisms. A combined secondary and tertiary treatment of wastewater typically involves an anaerobic zone, an anoxic zone and an aerobic zone, wherein wastewater is contacted with active sludge. The microorganisms present in the sludge effectuate sludge growth, wherein organic matter is converted into sludge. Surplus sludge is separated from the treated water by settlement and subsequently discharged from the wastewater treatment plant as waste.

Processes for the treatment of wastewater are for example known from WO2008/141413, wherein a mixture of wastewater and sludge, downstream of the anaerobic and aerobic zones, is led to a fast settler which operates discontinuously. Settled sludge is transferred to the anaerobic zone and the remainder of the mixture is led to a second settler. The heavy sludge is fed back to the process while the light sludge is subjected to post-treatment. The remaining part of the mixture of sludge and water is led to a settler and the sludge settled therein is recycled to the start of the treatment process.

US2011/0284461 describes a control system for aeration during the aerobic phase, and discloses a control system based on ammonia and oxygen concentration, in order to maximize nitrification. US2014/0091035 discloses a control system for wastewater treatment processes, wherein the amount of dissolved oxygen is controlled based on the ratio [ammonia] to [nitrite+nitrate].

WO2008/046139 discloses a wastewater treatment process, wherein wastewater is stepwise introduced into a reactor and multiple aerobic phases as well as an anaerobic phase are employed. During the first aerobic phase, a high dissolved oxygen setpoint is employed to promote nitrification, while during the second aerobic phase, simultaneous nitrification and denitrification is suggested to occur using a dissolved oxygen setpoint in the range of 0.3-0.5 mg/L. In addition to aeration control based on dissolved oxygen, also pH control is mentioned. Such control systems do not allow for the steering of the dissolved oxygen content to match the oxygen demand of the system.

WO2012/047923 discloses a control system for a wastewater treatment process, wherein aeration is turned on or turned off based on certain threshold levels of either one of dissolved oxygen, nitrate and ammonia concentration, redox potential, pH or temperature. No control of the aeration rate is disclosed, such that exact steering of the dissolved oxygen content to match the oxygen demand of the system is not possible.

WO2015/011213 discloses a granular wastewater treatment system, wherein aeration is controlled by variable setpoints for dissolved oxygen content. The value of the setpoint of a specific cyclic is controlled by the ammonia content of the wastewater during the previous cycle. During a single cycle, the setpoint is fixed. No aeration control based on the nitrogen oxide concentration is disclosed.

U.S. Pat. Nos. 5,242,592 and 5,626,754 disclose control systems for wastewater treatment process making use of the phosphate concentration. Phosphate concentrations are used as trigger to start and stop aeration. As no simultaneous nitrification and denitrification occurs, the system employs aerobic and anaerobic phases. No control based on nitrogen oxide concentration is disclosed.

WO2016/131998 also discloses a control system for the aeration rate during the aerobic phase, by monitoring the concentration of nitrification by-products, including $NH_4$, $N_2O$ and NO.

The major drawback of these prior art processes for controlling the aeration rate is that the amount of oxygen input is not directly related to the oxygen demand of the system, such that simultaneous nitrification and denitrification during the aerobic phase, if this occurs at all, does not occur efficiently as the amount of oxygen introduced may be too small, leading to under-aerated systems comprising substantial amounts of ammonium, or too great, leading to over-aerated systems comprising substantial amounts of nitrogen oxide and only very limited simultaneous denitrification taking place. The process for controlling the aeration rate according to the present invention provides in this need.

SUMMARY OF THE INVENTION

The invention concerns an improved control system that is suitable to control the aeration rate, for example the capacity at which the blowers operate, in w wastewater treatment process. The invention takes the form of a process for controlling the aeration rate during the aerobic phase of a wastewater treatment process, a process for the treatment of wastewater and a use of monitoring nitrogen oxides and ammonium concentrations for controlling the aeration rate of an aerobic phase during the treatment of wastewater.

The process according to the first aspect of the invention is for controlling the aeration rate during the aerobic phase of a wastewater treatment process, and comprises:
(a) measuring at moment $t_1$ the ammonium concentration $[NH_4^+]_1$ and nitrogen oxide concentration $[NO_x]_1$ in a mixture of wastewater and microbial sludge that is being aerated;

(b) determining a nitrogen oxide target concentration $[NO_x]^F_1$ at the end of the aerobic phase based on at least the current ammonium concentration $[NH_4^+]_1$ and the current $NO_x$ concentration $[NO_x]_1$;
(c) determining a setpoint $[NO_x]^{SP}_1$ based on interpolation between $[NO_x]_1$ and $[NO_x]^F_1$;
(d) adjusting the aeration rate to minimise the error between $[NO_x]_1$ and $[NO_x]^{SP}_1$;
(e) repeating steps (a) to (d) at further moments $t_i$.

The process according to the second aspect of the invention is for the treatment of wastewater, and comprises:
(A) contacting wastewater with microbial sludge in a reactor zone;
(B) aerating the mixture of wastewater and sludge;
(C) controlling the aeration rate using the process according to the first aspect of the invention; and
(D) separating sludge from the treated wastewater.

The use according to the invention is for monitoring nitrogen oxides and ammonium concentrations for controlling the aeration rate of an aerobic phase during the treatment of wastewater, wherein the monitoring comprises:
(a) measuring at moment $t_1$ the ammonium concentration $[NH_4^+]_1$ and nitrogen oxide concentration $[NO_x]_1$ in a mixture of wastewater and microbial sludge that is being aerated;
(b) determining a nitrogen oxide target concentration $[NO_x]^F_1$ at the end of the aerobic phase based on at least the current ammonium concentration $[NH_4^+]_1$ and the current $NO_x$ concentration $[NO_x]_1$;
(c) determining a setpoint $[NO_x]^{SP}_1$ based on interpolation between $[NO_x]_1$ and $[NO_x]^F_1$;
(d) adjusting the aeration rate to minimise the error between $[NO_x]_1$ and $[NO_x]^{SP}_1$;
(e) repeating steps (a) to (d) at further moments $t_i$.

LIST OF PREFERRED EMBODIMENTS

1. A process for controlling the aeration rate during the aerobic phase of a wastewater treatment process, comprising:
   (a) measuring at moment $t_1$ the ammonium concentration $[NH_4^+]_1$ and nitrogen oxide concentration $[NO_x]_1$ in a mixture of wastewater and microbial sludge that is being aerated;
   (b) determining a nitrogen oxide target concentration $[NO_x]^F_1$ at the end of the aerobic phase based on at least the current ammonium concentration $[NH_4^+]_1$ and the current $NO_x$ concentration $[NO_x]_1$;
   (c) determining a setpoint $[NO_x]^{SP}_1$ based on interpolation between $[NO_x]_1$ and $[NO_x]^F_1$;
   (d) adjusting the aeration rate to minimise the error between $[NO_x]_1$ and $[NO_x]^{SP}_1$;
   (e) repeating steps (a) to (d) at further moments $t_i$.
2. Process according to embodiment 1, wherein the wastewater treatment process is a batch-wise or a continuous wastewater treatment process, preferably a batch-wise wastewater treatment process.
3. Process according to any one of the preceding embodiments, wherein steps (a) to (d) are repeated at intervals ☐t, preferably wherein ☐t is at most 60 minutes.
4. Process according to any one of the preceding embodiments, wherein the repeating of step (e) occurs 10-1000000 times during the aerobic phase.
5. Process according to any one of the preceding embodiments, wherein step (a) is performed by direct or indirect measurement, preferably wherein direct measurement involves measuring the ammonium and nitrogen oxide concentration using a probe capable of determining the concentration based on wet-chemical or physical properties and indirect measurement involves measuring the redox potential, conductivity or pH which is translated into the ammonium concentration and nitrogen oxide concentrations.
6. Process according to any one of the preceding embodiments, wherein the aeration rate at the start of the aerobic phase is steered towards an aeration capacity of at least 50% of the installed maximum aeration capacity.
7. Process according to any one of the preceding embodiments, wherein step (d) is performed by a controller selected from P-controllers, PI-controllers, PD-controllers, PID-controllers and fuzzy controllers.
8. Process according to any one of the preceding embodiments, wherein the aeration rate is varied in the range of 0-10 $Nm^3$ $O_2$ per $m^3$ reactor volume per hour.
9. Process according to any one of the preceding embodiments, wherein the wastewater treatment process is a granular sludge process or a biofilm wastewater treatment process.
10. Process according to any one of the preceding embodiments, wherein aeration is performed by introducing an oxygen-containing gas, preferably air, in a reaction zone comprising the mixture.
11. A process for the treatment of wastewater, comprising:
    (A) contacting wastewater with microbial sludge in a reactor zone;
    (B) aerating the mixture of wastewater and sludge;
    (C) controlling the aeration rate using the process according to any one of embodiments 1-10; and
    (D) separating sludge from the treated wastewater.
12. Process according to embodiment 11, wherein the microbial sludge is granular or in the form of a biofilm.
13. Process according to embodiment 11 or 12, wherein the wastewater is pretreated prior to step (A), preferably by one or more of clarification, grit removal, fat and grease removal, pH-adjustment and pre-sedimentation.
14. Process according to any one of embodiments 11-13, which is operated batch-wise or continuously, preferably batch-wise.
15. Use of monitoring nitrogen oxides and ammonium concentrations for controlling the aeration rate of an aerobic phase during the treatment of wastewater, wherein the monitoring comprises:
    (a) measuring at moment $t_1$ the ammonium concentration $[NH_4^+]_1$ and nitrogen oxide concentration $[NO_x]_1$ in a mixture of wastewater and microbial sludge that is being aerated;
    (b) determining a nitrogen oxide target concentration $[NO_x]^F_1$ at the end of the aerobic phase based on at least the current ammonium concentration $[NH_4^+]_1$ and the current $NO_x$ concentration $[NO_x]_1$;
    (c) determining a setpoint $[NO_x]^{SP}_1$ based on interpolation between $[NO_x]_1$ and $[NO_x]^F_1$;
    (d) adjusting the aeration rate to minimise the error between $[NO_x]_1$ and $[NO_x]^{SP}_1$;
    (e) repeating steps (a) to (d) at further moments $t_i$.

DETAILED DESCRIPTION

Figure 1:
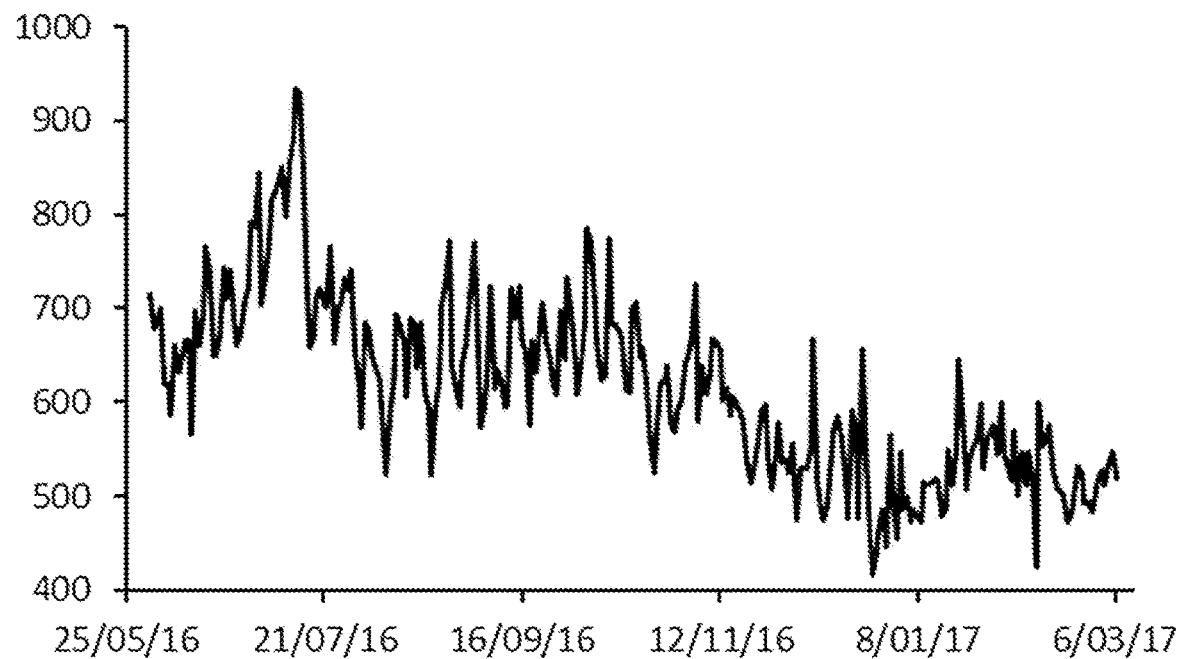
FIG. 1 depicts the energy consumption (in kWh/day) of the blowers during the aerobic phase under conventional control or under control according to the present invention (see Example). At a sewage treatment plant in Australia, the existing conventional aeration control was replaced mid October 2016 by the control according to the invention. As can be seen, the overall power consumption for the aeration was reduced by about 25%, while the sewage treatment plant continued to produce a treated effluent with a total nitrogen concentration of approx. 3 ppm.

During the aerobic phase (or aerobic phase) of a wastewater treatment process, a mixture of wastewater and sludge is aerated. Aeration is known in the art and involves the introduction of a oxygen-containing gas in the reaction zone. Any oxygen-containing gas can be used in this respect, but typical examples include oxygen, air and mixtures thereof. Under such aerobic conditions, ammonium that may be present in the wastewater, is converted into nitrogen oxides such as nitrate and/or nitrite (nitrification).

Conventional wastewater treatment process are operated by controlling the amount of oxygen that is introduced during the aerobic phase. Thus, the amount of oxygen being introduced is controlled by the oxygen concentration in the wastewater. Typically, a target value (or setpoint) of about 1-2 mg oxygen per mL wastewater is used. In case the oxygen concentration drops below this target value the aeration rate, i.e. the amount of oxygen that is introduced, is increased, while this rate is decreased when the oxygen concentration rises above the target value. As such, sufficient oxygen is present during the entire aerobic phase, such that nitrification occurs efficiently. However, in view of the surplus of oxygen, hardly any denitrification occurs during this phase, and significant amounts of nitrogen oxide are present in the wastewater at the end of the aerobic phase. In order to cleanse the wastewater from nitrogen compounds, nitrogen oxides need to be converted into nitrogen gas, for which reason an anoxic phase needs to follow the aerobic phase. Under anoxic conditions, denitrification occurs and nitrogen oxides are converted into nitrogen gas, which remains in solution or escapes the wastewater in gaseous form.

The inventors developed a process wherein nitrification and denitrification can efficiently occur simultaneously during a single phase, such that at the end of that phase ammonium is largely converted into nitrogen gas. This is accomplished by controlling the aeration rate not based on a target value of the oxygen concentration, but by a target value of the nitrogen oxide concentration.

The inventors surprisingly found that simultaneous denitrification rate can effectively be maximised by limiting the nitrate production rate dynamically to match the instantaneous available simultaneous denitrification capacity of the biological reactor by an inventive aeration control targeting a minimised nitrogen oxide production rate.

The process according to the invention does not operate at a fixed aeration rate, nor at a fixed oxygen concentration. Instead, these are adapted to the oxygen demand of the system, such that no (great) surplus of oxygen is present during the aerobic phase. As such, both nitrification and denitrification can occur simultaneously.

The process of the invention has many advantages over conventional wastewater treatment processes. First and foremost, the need for a separate denitrification (anaerobic) phase is completely eliminated. This in turn leads to a reduced need for recycles, pumps, etc. Also, no pre- and post-denitrification is required. Further advantages include a reduced oxygen input and thus reduced energy input, the risk of over-aeration is minimized and phosphorus accumulating organisms (PAOs) maintain their maximum phosphorus-uptake capacity throughout the process. This all leads to wastewater treatment effluents that have an improved quality in terms of phosphorus, nitrogen and COD (chemical oxygen demand).

In a first aspect, the present invention thus pertains to a process for controlling the aeration rate during the aerobic phase of a wastewater treatment process, comprising:
(a) measuring at moment $t_1$ the ammonium concentration $[NH_4^+]_1$ and nitrogen oxide concentration $[NO_x]_1$ in a mixture of wastewater and microbial sludge that is being aerated;
(b) determining a nitrogen oxide target concentration $[NO_x]^F_1$ at the end of the aerobic phase based on the current ammonium concentration $[NH_4^+]_1$, the current $NO_x$ concentration $[NO_x]_1$, and preferably the remaining aerobic time and the extent of simultaneous denitrification available within the remaining aerobic time;
(c) determining a setpoint $[NO_x]^{SP}_1$ based on interpolation between $[NO_x]_1$ and $[NO_x]^F_1$;
(d) adjusting the aeration rate to minimise the error between $[NO_x]_1$ and $[NO_x]^{SP}_1$;
(e) repeating steps (a) to (d) at further moments $t_i$.

The process according to the present aspect may also be referred to as a process for nitrifying and simultaneous denitrifying wastewater, wherein wastewater is subjected to an aerobic phase of a wastewater treatment process, and which further comprises steps (a)-(e) as defined herein. The process for controlling the aeration rate according to this aspect of the invention can be implemented in any type of wastewater treatment process that employs microorganisms for converting organic matter into sludge and nitrogen gas. This may also be referred to as a biological wastewater treatment process. In one embodiment, the wastewater treatment process is a sewage treatment process.

The process according to the invention is particularly suited to control the aeration in a granular wastewater treatment process or biofilm wastewater treatment process. As the inside of the granules remains anoxic during the entire aerobic phase, the simultaneous denitrification which is obtained by the control process according to the present invention, is even further enhanced, as such lowering the amount of nitrogen oxide that remains in the system at the end of the aerobic phase to an absolute minimum. In one embodiment, the wastewater treatment process is a granular wastewater treatment process or a granular sludge process. In an alternative embodiment, the process for treating wastewater is a biofilm wastewater treatment process.

The process according to this aspect can be used to control both a batch-wise and a continuous wastewater treatment process, which both benefit from the present invention. In one embodiment, it concerns a batch-wise process, and the end of the aerobic phase is defined as the end of the duration of the aerobic phase in a batch-wise wastewater treatment process. In an alternative embodiment, it concerns a continuous process, and the end of the aerobic phase is defined as the end of the aerobic reaction zone in a continuous wastewater treatment process. Most optimal results have been obtained in a batch-wise process for the treatment of wastewater.

The wastewater and the sludge are typically present in a reaction zone, often referred to as the aerobic zone. As such treatment typically occurs in tanks, the aerobic zone may also be referred to as the aerobic tank. Such a reaction zone typically contains an inlet and means for introducing an oxygen-containing gas, preferably in the form of aerators or blowers. Such use of blowers to introduce an oxygen-containing gas in the aerobic zone of a wastewater treatment process is known in the art and can be employed as conventional. Any oxygen-containing gas may be used to aerate the mixture of wastewater and sludge. In one embodiment, the oxygen-containing gas is oxygen, air or a mixture thereof. Most preferably, air is used.

Aeration rate refers to the rate at which oxygen is introduced, and is typically recorded in $m^3$ gas per $m^3$ reactor volume per hour. The aeration rate is governed by the introduction of oxygen-containing gas to the mixture of wastewater and sludge, typically by the blowers that introduce this gas into the aerobic reaction zone. Thus, the process according to this aspect may also be referred to as a process for controlling the blowers, wherein the capacity of the blowers is increased or decreased or unchanged in step (d). Typically, the capacity of a single blower varies between 40% and 100% (blower maximal). When more than one blower is used, the capacity of each individual blower can be controlled, providing a broader range between which the capacity may vary. Preferably, 2-10 blowers are used. In terms of oxygen input, the aeration rate is typically varied in the range of 0-10 $m^3$, preferably 0.02-4 $m^3$ $O_2$ per $m^3$ reactor volume per hour. When air is used as oxygen-containing gas, aeration rates are preferably varied in the range of 0-50 $Nm^3$, preferably 0.1-20 $Nm^3$ air per $m^3$ reactor volume per hour.

Measuring concentrations during wastewater treatment, such as ammonium and nitrogen oxide (e.g. nitrate+nitrite or nitrous oxide) concentrations, is known in the art, for example from WO 2012/047923. The measuring of step (a) may also be referred to as "monitoring". In the context of the present invention, "nitrogen oxide" is also referred to as $NO_x$ and includes nitrate, nitrite and $N_2O$. Suitable nitrogen oxide species include $N_2O$, $NO_3$, $NO_2$ and combinations thereof. The nitrogen oxide concentration $[NO_x]$ that is measured in step (a) is preferably selected from $NO_3^-$ (x=3), $NO_2^-$ (x=2) and $N_2O$ (x=0.5), and combinations thereof. In one embodiment, the total concentration of $NO_3^-$ and $NO_2^-$ is measured in step (a). In an alternative embodiment the nitrogen oxide concentration is approximated by measuring the $NO_3^-$. In an alternative embodiment the concentration of $NO_3^-$ is measured in step (a). In an alternative embodiment, the concentration of $N_2O$ is measured in step (a). These species have been found suitable as reference for the oxygen demand of the wastewater treatment system.

The monitoring of step (a) can be performed by direct or indirect measurement. In one embodiment, the ammonium and/or nitrogen oxide concentration are monitored using probes, devices or analysers capable of determining the concentration. Such probes instantaneously or semi-instantaneously provide a signal based on the actual concentration of ammonium and nitrogen oxide. As known in the art, these probes use physical or wet-chemical principles to directly detect these concentrations, or the concentration of equivalent parameter like Kjeldahl nitrogen (nitrogen that can be oxidized and includes ammonium) or total organic nitrogen. As result of the progressing nitrification and denitrification during the aerobic phase, also other parameters like the pH, conductivity and the redox potential of the wastewater changes. In literature (e.g. CECIL D, Water Science and Technology, 2008, vol. 57(7): 1095-1101 and AL-GHU-SAIN I, Journal of environmental engineering (New York, N.Y.) A. 1995, vol. 121(3): 225-235) it is well described that, rather than measuring the ammonium and nitrogen oxide concentration directly, the progress of the nitrification and denitrification can be approximated indirectly by monitoring e.g. the pH-value, conductivity or redox potential and translating these into the ammonium concentration and/or nitrogen oxide concentration. Thus, in an alternative embodiment, an indirect measurement of the ammonium and/or nitrogen oxide concentration is used to determine the progress of the nitrification and denitrification. Such indirect measurement is preferably selected from measurement of pH, conductivity and redox potential.

Step (a) is typically performed continuously as long as the aerobic phase lasts, although the process according to this aspect also works efficiently when concentrations are not measured during the entire duration of the aerobic phase. For example, starting the monitoring when the aerobic phase is already started, e.g. 10% of the duration has already lapsed, also provides good results. In the scenario when the monitoring is only started after some aeration time has already lapsed, it is preferred that the aeration is stirred to an as high as possible rate. Thus, in one embodiment, the aeration rate at the start of the aerobic phase is steered towards an aeration capacity near or at the installed maximum aeration capacity, such as at least 50%, preferably at least 80% or even at least 90% of the installed maximum aeration capacity. The aeration rate will be reduced according to steps (a)-(d) as soon as the monitoring of step (a) commences. Notably, also when the monitoring is performed during the entire aerobic phase, it is preferred that the aeration rate is at or near maximal in the beginning of the aerobic phase, as defined here above. Herein, the "beginning" or "start" preferably refers to the first 5-25%, preferably 10-15%, of the aerobic phase, expressed in terms of duration when it concerns a batch-wise process and in terms of location in the aerobic tank when it concerns a continuous process. Thus, in a preferred embodiment, the aeration rate is maximal in the beginning of the aerobic phase.

The concentration measurements are preferably performed in quick succession or even continuously. The number of measurements is not limited, since more measurements typically provide better control. It is preferred that the total number is at least 5, more preferably at least 10, even more preferably at least 40. In one embodiment, the number of measurements of $[NH_4^+]$ and $[NO_x]$ during the aerobic phase is in the range of 10-1000000, preferably 40-250000, most preferably 50-100000. The moment at which a measurement is conducted is herein referred to as $t_i$, wherein i refers to a specific measurement. For example, the first measurement is conducted at $t_1$. The interval between two measurements is referred to as $\Delta t$. So, the second measurement is conducted at $t_2=t_1+\Delta t$. At moments $t_1$ and $t_2$, the ammonium concentration is referred to as respectively $[NH_4^+]_1$ and $[NH_4^+]_2$, and nitrogen oxide concentration as respectively $[NO_x]_1$ and $[NO_x]_2$. Herein, t refers to a point in time when the present process is for controlling a batch-wise wastewater treatment process, and to a point in space in the aerobic tank of a continuous wastewater treatment process. Qt may be infinitesimal small, i.e. concentrations are measured continuously, and for controlling batch-wise wastewater treatment processes Δt is preferably not larger than 60 minutes, preferably 30 minutes or even 10 minutes. In a preferred embodiment for controlling batch-wise wastewater treatment processes, Δt is in the range of 0.1 second-60 minutes, preferably 1 second-30 minutes. Optimal values for Δt may vary depending on the total duration of the aerobic phase and are typically in the range of 0.001-10%, preferably 0.01-5%, of the total duration of the aerobic phase. In a preferred embodiment for controlling continuous wastewater treatment processes, Δt is in the range of 0.1-10 m. Optimal values for Δt may vary depending on the total size of the aerobic tank and are typically in the range of 0.001-10%, preferably 0.01-5%, of the total duration of the aerobic phase. Thus, in one embodiment, Δt=0.001-10%, preferably 0.01-5%, of the total aerobic phase. Although typically the quality of control will improve when Δt gets smaller, excellent results have already been obtained with a Δt of 5 minutes or 2% of the duration of the aerobic phase (60 measurements during a 5 h aerobic phase).

The process according to the invention aims to maximize the amount of simultaneous denitrification by shifting the balance between nitrification and simultaneous denitrification towards simultaneous denitrification by minimizing the nitrification rate to the lowest possible value by which the ammonium setpoint is met. The minimum nitrification rate is converted into a nitrate production rate. To do this, each measurement of $[NH_4^+]_i$ and $[NO_x]_i$ is used in step (b) to determine or calculate a potential final nitrogen oxide concentration $[NO_x]^F_i$. $[NO_x]^F_i$ refers to the expected amount of nitrogen oxide that would be formed if the ammonium and organically bound $NH_4^+$ present in the mixture of wastewater and sludge at moment $t_i$ would be converted into nitrogen oxide. The determination of $[NO_x]^F_i$ is at least based on the current ammonium concentration $[NH_4^+]_1$ and the current $NO_x$ concentration $[NO_x]_1$. Thus, in one embodiment, $[NO_x]^F_i=[NH_4^+]_i+[NO_x]_i$ (based on total nitrogen). In a preferred embodiment, also the remaining aerobic time and the extent of simultaneous denitrification available within the remaining aerobic time is taken into account. Thus, it is preferred that the determination of $[NO_x]^F_i$ in step (b) also takes into account the amount of nitrogen oxide that would normally be lost upon denitrification and growth. The skilled person appreciates that the amount of nitrogen oxide lost on growth typically depends on the quality of the incoming wastewater and the applied biological reactor loading and achieved sludge yield, whereas the amount lost by denitrification is strongly depending on the applied biological mixed liquor sludge concentration, the aeration rate and the actual denitrification capacity empirical experienced in the process. The skilled person will thus be capable of defining an appropriate value for the amount of nitrogen oxide that would be lost upon denitrification and growth in the wastewater treatment system in question. The remaining of the aerobic time may also be referred to as the remaining duration of the aerobic phase. In case the aerobic phase would run from $t_0$ to $t_r$, the remaining of the aerobic time is defined as $t_r-t_i$. The simultaneous denitrification capacity that is preferably used to determination of $[NO_x]^F_i$ can be based on experience of the skilled user of the system or be extracted by automatic evaluation of the overall simultaneous denitrification capacity achieved in a number of previous aeration phases. As the simultaneous denitrification rate changes in time based on temperature and sludge concentrations, the latter approach results in that the controller adapts to the actual characteristics of the biological reactor, which is thus the preferred method for determining simultaneous denitrification.

After each measurement a nitrogen oxide production rate is determined by interpolation between $[NO_x]_i$ and $[NO_x]^F_i$ over the remaining duration of the aerobic phase. This rate is used to determine a nitrogen oxide setpoint $[NO_x]^{SP}_i$ for the next time step Δt. Herein, $[NO_x]^{SP}$ is typically defined as $[NO_x]+rate\times Δt$. The thus obtained setpoint $[NO_x]^{SP}_i$ refers to the intended nitrogen oxide concentration at the next moment in the aerobic phase, i.e. at $t_i+Δt$. The aforementioned interpolation is typically based on a linear time assumption, but also none-linear approximation can be used.

In step (d), the aeration rate is adjusted in order to minimise the error between $[NO_x]_i$ and $[NO_x]^{SP}_i$, which may be achieved using standard control algorithms well-known to the person skilled in the art. Such control algorithms include P-controllers, PI-controllers, PD-controllers, PID-controllers and fuzzy controllers. Preferably, a PI- or PID-controller is used, such that the accumulative error (the integral term) plays a role in adjusting the aeration rate. Based on the control algorithm, adjustment of the aeration rate is typically selected from reducing the aeration rate, increasing the aeration rate and leaving the aeration rate untouched. For example, at the beginning of the aerobic phase the aeration rate may be too high and should be reduced to enable optimal simultaneous denitrification to occur. Thus, in such a situation the aeration rate at $t_i$ will be reduced, such that the deviation of the actual nitrogen oxide concentration $[NO_x]_{i+1}$ from the setpoint $[NO_x]^{SP}_i$ is minimized. This is re-evaluated at various moments t throughout the aerobic phase, in step (e). The repeating of step (e) is performed at further moments $t_i$, wherein i>1. Steps (a)-(d) are typically repeated at intervals Δt, as defined above. In doing so, any over- or under-adjustment of the aeration rate will automatically be rectified.

In the process for controlling the aeration rate according to the invention, by virtue of the repeating of step (e), the setpoint $[NO_x]^{SP}$ that governs the aeration rate is constantly re-evaluated during the aerobic phase, such that at the end of the aerobic phase the amount of oxygen that is provided to the mixture of wastewater and sludge is sufficient to convert all ammonium into nitrogen oxide but at the same time is low enough that all nitrogen oxide is converted into nitrogen gas. As such, the aeration rate changes with the oxygen demand of the system, which enables nitrification and denitrification to occur simultaneously. The control process according to the present invention ensures a dramatically lowered nitrogen oxide concentration at the end of the aerobic phase, compared to conventionally-controlled aeration in the treatment of wastewater. Most optimally, the amount of nitrogen oxide that is present at the end of the aerobic phase is sufficiently low that a direct effluent to the environment is possible, which may be obtained in case the duration of the aerobic phase is sufficiently long, which in turn is mainly governed by the amount of incoming wastewater. Further, the extent of pollution of the incoming wastewater has an influence on the amount of nitrogen oxide present at the end of the aerobic phase. The inventors found that the nitrogen oxide concentration at the end of the aerobic phase could be reduced from a typical value of 10 mg/L to an unforeseen low value of 0.5 mg/L.

Notably, even if not all nitrogen oxide would be removed from the wastewater at the end of the aerobic phase, the control process according to the present invention provides a marked improvement over conventional control systems, as the amount of oxygen that is introduced is drastically reduced, which reduces power consumption and operating costs. As power consumption for aeration is one of the primary operation costs for the sewage treatment plant the achieved power saving significantly reduces the operational costs of the plant and associated greenhouse gas contribution. Further, the anoxic phase can be shortened or even completely eliminated. Shorter cycles can thus be employed, which increases the capacity of a given wastewater treatment facility. The need for recycles between the anaerobic and the aerobic phase is eliminated, which reduced the amount of pipes and pumps needed. Furthermore, the inventors found that using the control system according to the invention, phosphorus was more efficiently removed from the wastewater, leading to cleaner effluents. As the amount of oxygen provided during the aerobic phase is reduced, the anaerobic phosphorus accumulating organisms are better capable to capture phosphorus, especially when they are incorporated into granular sludge or biofilms. A further advantage is that monitoring the oxygen content is not required, which reduces the number of probes or sensors needed. In one embodiment, the process according to this aspect does not include the measurement or the monitoring of the oxygen concentration in the mixture of wastewater and sludge.

In a second aspect, the invention pertains to a process for treating wastewater, wherein the control process according to the first aspect is implemented. Thus, the invention also concerns a process for the treatment of wastewater, comprising:
(A) contacting wastewater with microbial sludge in a reactor zone;
(B) aerating the mixture of wastewater and sludge;
(C) controlling the aeration rate using the process according to the first aspect of the present invention; and
(D) separating sludge from the treated wastewater.

The wastewater treatment process can be any process that employs microorganisms for converting organic matter into sludge and nitrogen gas.

Preferably, the microorganisms are aerobic microorganisms. This may also be referred to as a biological wastewater treatment process. In one embodiment, the wastewater treatment process is a sewage treatment process. The process according to this aspect can be a batch-wise or a continuous wastewater treatment process. In one embodiment, it concerns a batch-wise process. In an alternative embodiment, it concerns a continuous process. In a preferred embodiment, the process for treating wastewater is a granular wastewater treatment process or a granular sludge process. In other words, the microbial sludge is preferably granular. In an alternative embodiment, the process for treating wastewater is a biofilm wastewater treatment process. In other words, the microbial sludge is preferably in the form of a biofilm. Although any type of microorganism suitable in the application of wastewater treatment can be used, in one embodiment the wastewater treatment does not concern a so-called Annamox treatment. In other words, in one embodiment, the microorganism(s) used in the wastewater treatment process are not capable of anaerobic ammonium oxidation. Alternatively, in one embodiment, the microorganism(s) used in the wastewater treatment process are capable of converting $NH_4$ and $O_2$ into $NO_3$ and/or $N_{O2}$. Preferably, the microorganism(s) used in the wastewater treatment process include at least nitrifying bacteria.

The wastewater to be treated with the process according to this aspect typically contains an organic nutrient (organic matter). Typically, the biochemical oxygen demand (BOD) of the incoming wastewater is at least 50 mg/L, such as 100-10000 mg/L. Any type of wastewater, such as sewage water or industrial wastewater, may be treated according to the invention. The process according to the invention may thus also be referred to as wastewater treatment. The wastewater subjected to the process according to the invention may be pretreated prior to step (A), such as wastewater that has received a primary treatment as known in the art, although primary treatment will not always be necessary to operate the present process efficiently. Typical pretreatment of the wastewater includes one or more of clarification, grit removal, fat and grease removal and pre-sedimentation.

Aeration of a mixture of wastewater and microbial sludge is well-known in the art of wastewater treatment and is further defined above. Herein, a mixture of wastewater and sludge is subjected to an aerobic zone. As wastewater treatment typically occurs in tanks, the aerobic zone may also be referred to as the aerobic tank. The aerobic zone may be preceded by an upstream anaerobic zone as known in the art. The use of an anoxic tank in between the anaerobic and the aerobic zones is typically not required, as the control process of step (C) ensures efficient nitrification and denitrification during the aerobic phase. Also, recycles of sludge/water mixtures from the aerobic zone to the anoxic zone and/or from the anoxic zone to the anaerobic zone are not required, while purification of the wastewater remains effective. Eliminating such recycles greatly improves the efficiency of the process. The mixture of (waste)water and sludge resides in the aerobic zone of step (B) for a sufficient amount of time to allow effective uptake and/or removal of organic nutrients, nitrogen and phosphorus from the incoming wastewater. Average residence times of the mixture of sludge and water in the aerobic zone of step (B) may vary greatly, depending on e.g. the extent and type of pollution in the incoming wastewater, and are typically 30 min-3 days, preferably 1 h-2 days.

In step (C), the extent of aeration during the aerobic phase of step (B) is controlled by the process according to the first aspect of the present invention, which is further defined above.

In step (D), the mixture of sludge and water originating from step (B) is separated into sludge and treated water. Separation is typically based on settling of the sludge particles and is preferably performing using a settling tank or an upflow reactor. Step (D) may thus also be referred to as a settling step. The water that is discharged from the separator is referred to as "treated water". Separating sludge from water is known in the art. In settling step (D), the sludge in the mixture of sludge and water originating from step (B) is allowed to settle. Such a settling step, during which the sludge is separated from the treated water, is common for conventional wastewater treatment plants. The incoming mixture of water and sludge resides for a sufficient amount of time in the settling tank or upflow reactor to allow settlement of the sludge. Once the sludge is essentially settled, the water is clarified from sludge and may be considered clean and discharged to the environment, although for some applications and/or locations, additional further treatment such as removal of metals may be desired. Whether or not further treatment takes place is irrelevant for the present invention. Typically, the settling of step (D) occurs in a settling tank. Any type of settling tank known in the art may be used in the present process. Settling tanks typically have a conical shape with a wide upper part and a narrow bottom. Sludge particles accumulate at the bottom, from which it is collected, preferably using an outlet located in the bottom of the settling tank. Treated water is typically discharged via an outlet at the top of the settling take, preferably using an overflow.

In case an upflow reactor is used in step (D), the selection of the sludge is accelerated using an upflow. Herein, the mixture of sludge and water originating from step (B) is subjected to an upflow reactor, wherein the sludge particles settle at the bottom while the water depleted in sludge emerges at the top of the upflow reactor. This water is discharged as treated water. The upflow reactor preferably operates with an upflow speed of 0.1-10 m/h, more preferably 1-5 m/h. Using a settling tank or an upflow reactor operated with such an upflow, all sludge is allowed to settle, such that the treated water is clarified from all sludge before it is discharged from the system. Typical residence times of the mixture of sludge and water in the upflow reactor are 5 min-24 h, preferably 15 min-10 h.

The sludge that is separated is preferably at least partly returned to the aerobic zone of step (B). The remainder is a by-product of the wastewater treatment according to the invention and is thus discharged from the system. It may be used or processed as deemed fit. Typically, discharged sludge is subjected to a sludge treatment step as known in the art. As the sludge obtained by the process according to the invention contain valuable components, these may be extracted from the sludge. The skilled person knows how to determine the amount of sludge that should be returned to step (B) in order to run the process effectively. The treated water that is discharged from the separator in step (D) is the major product of the process according to the invention. The treated water is depleted in organic matter (COD) and pollutants (nitrogen, phosphorus) compared to the incoming wastewater. The treated water discharged from step (D) may be discharged to the environment, further purified or used as deemed fit.

In a third aspect, the invention thus pertains to the use of $NO_3$ concentration monitoring for controlling a process for the treatment of wastewater, more in particular for controlling the aerobic phase. The monitoring comprises:
  (a) measuring at moment $t_i$ the ammonium concentration $[NH_4^+]_1$ and nitrogen oxide concentration $[NO_x]_1$ in a mixture of wastewater and microbial sludge that is being aerated;
  (b) determining a nitrogen oxide target concentration $[NO_x]^F_1$ for the nitrate concentration at the end of the aerobic phase based on at least the current ammonium concentration $[NH_4^+]_1$ and the current $NO_x$ concentration $[NO_x]_1$;
  (c) determining a setpoint $[NO_x]^{SP}_1$ based on interpolation between $[NO_x]_1$ and $[NO_x]^F_1$;
  (d) adjusting the aeration rate to minimise the error between $[NO_x]_1$ and $[NO_x]^{SP}_1$;
  (e) repeating steps (a) to (d) at further moments $t_i$.

Preferred embodiment for the use according to the present aspect are defined above for the process according to the first and second aspect of the invention, which equally apply to the use according to the third aspect of the invention.

Example

A sewage treatment plant with a design treatment capacity of 12,500 people equivalents and 305 l/s was used for the trial. Over the duration of the trial, the plant received pollution loads up to 14,600 pe. The pollution concentrations in the untreated wastewater was up to 970 ppm COD, 588 ppm TSS, 120 ppm $NH_4$—N and 9.5 ppm TP. The biological treatment reactors were equipped with probes to measure dissolved oxygen (Luminescent Dissolved Oxygen Probe manufactured by Hach) and with on-line analyzers to measure ammonium (digital on-site analyzer Amtax manufactured by Hach) and nitrate (digital, optical probe Nitratax manufactured by Hach).

FIG. 1 show the measured power consumption for aeration. After start-up, from August 2016 onwards, the plant was in stable operation and the pollution load comparable. Until the end of October 2016, the plant was operated using classical control (the conventional period) and since October 2016 the plant was operated using the control system according to the invention (the inventive period). These two periods show clear differences in energy consumption as can be seen in FIG. 1. Whereas the effluent quality is very comparable for both periods—meeting $NH_4$ and $PO_4$ values of below 1 mg/l and total nitrogen of <3 mg/l—and the plant continuously operated well within the stringent local discharge regulations, the overall power consumption for the aeration was reduced by about 25%. This demonstrates the significant power saving that can be achieved using the control system according to the invention.

Figure 2:
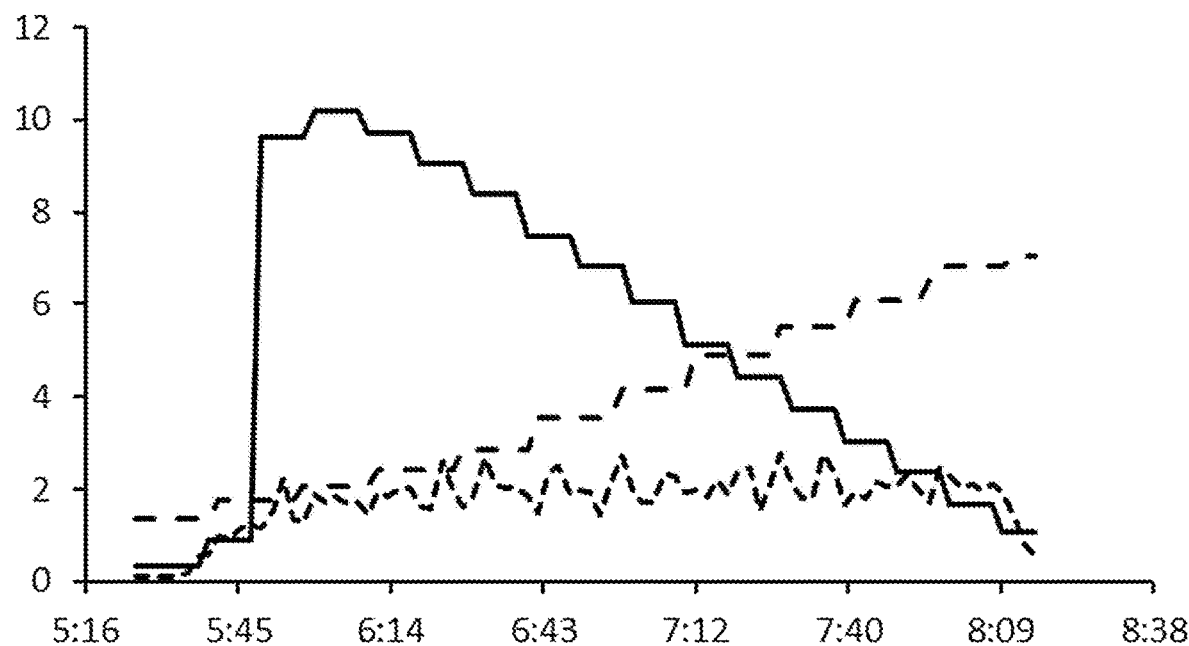
FIG. 2 shows the concentration (in mg/L) of $NH_4$, $NO_3$ and $O_2$ over the duration of the aerobic phase under conventional control (see Example). Key: solid=$NH_4$; stripes (- - -)=$NO_3$; small stripes (- - -)=$O_2$.
Figure 3:
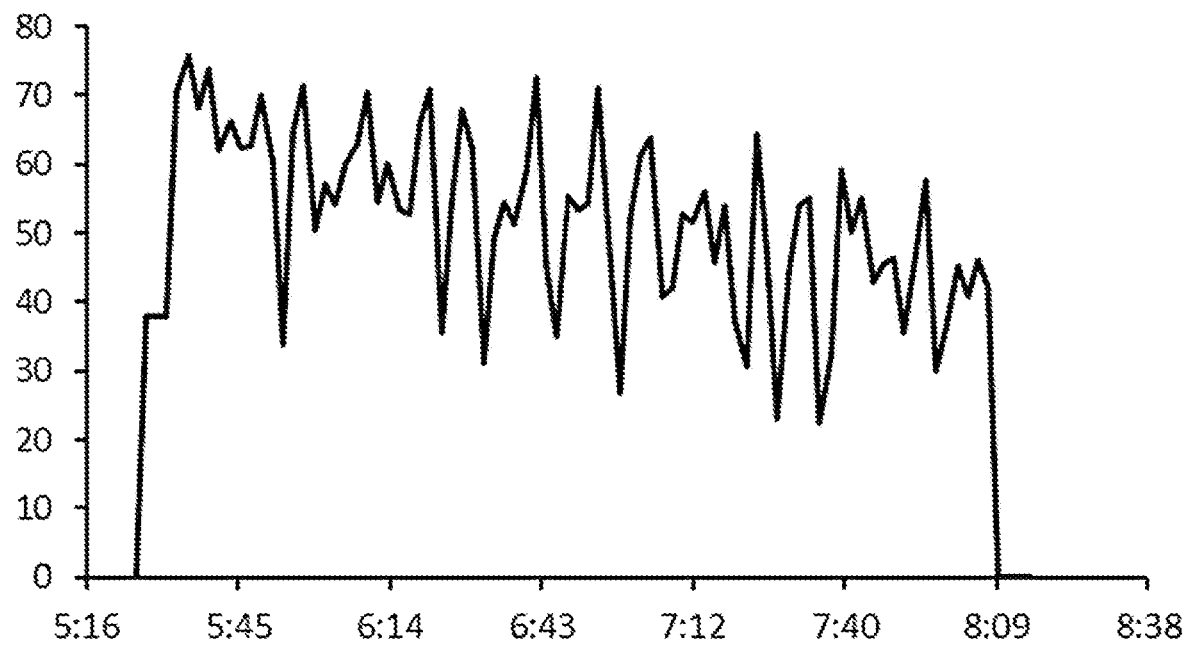
FIG. 3 depicts the capacity of the blowers (in % of maximum capacity) over the duration of the aerobic phase under conventional control (see Example).

FIGS. 2 and 3 concern the conventional period. In FIG. 2, the ammonium, nitrate and dissolved oxygen concentrations during an aeration cycle. FIG. 3 depicts the aeration blower capacity (in percentage of maximal capacity) was imposed by the control algorithm. The controller targeted to maintain the oxygen concentration in the reactor at a fixed value during the complete duration of the aeration phase. As can be seen in FIG. 2, the aeration capacity was sufficient to maintain the oxygen concentration at the desired value of about 2 mg/l. Note that the aeration capacity is not reaching the maximum value in the batch and theoretically the treatment could have been executed in a shorter time interval, creating more treatment capacity. The graph illustrates clearly that in conventional control, aeration is stopped after $NH_4$ has reached the targeted end value and the remaining time is used for additional denitrification. This conventional control leads to a quite stable $O_2$ concentration during the entire aeration phase and consequently also to a stable $NH_4$ conversion in which $NH_4$ is removed until the targeted $NH_4$ concentration is reached. However, simultaneous denitrification is not optimized resulting in higher than necessary power consumption. Moreover, the conventional control results in a suboptimal treatment capacity. During aeration, there is a continuous change of aeration capacity to maintain the oxygen concentration at the required value in this example of 2 mg/l. The maximum concentration nitrogen from $NH_4$ is 11 mg/l is during aeration converted to 7 mg/l nitrogen from $NO_3$, meaning that 4 mg/l nitrogen is simultaneously denitrified. After aeration was stopped, post-denitrification lowers the $NO_3$ concentration with a further 2 mg/l. Notably, the increase of $NO_3$ during aeration is not constant over the aeration phase, but at the beginning of the aeration the $NO_3$ increase is slower, implying that when under classical control the full simultaneous denitrification capacity of the biological process is not achieved.

Figure 4:
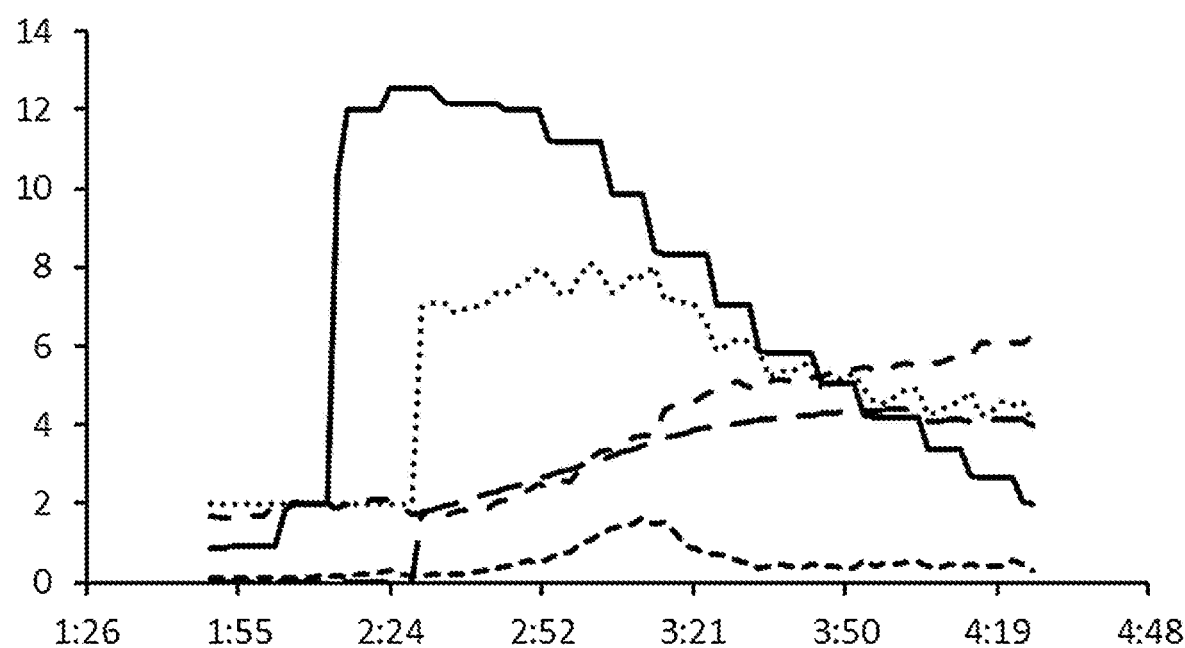
FIG. 4 shows the concentration (in mg/L) of $NH_4$, $NO_3$ and $O_2$ over the duration of the aerobic phase control according to the present invention, as well as the estimated $NO_3$ concentration at the end of the aerobic phase and the setpoint that is established by intrapolation (see Example). Key: solid=$NH_4$; stripes (- - -)=$NO_3$; dots=estimated end $NO_3$ concentration; large stripes (- -)=$NO_3$ setpoint; small stripes (- - -)=$O_2$.
Figure 5:
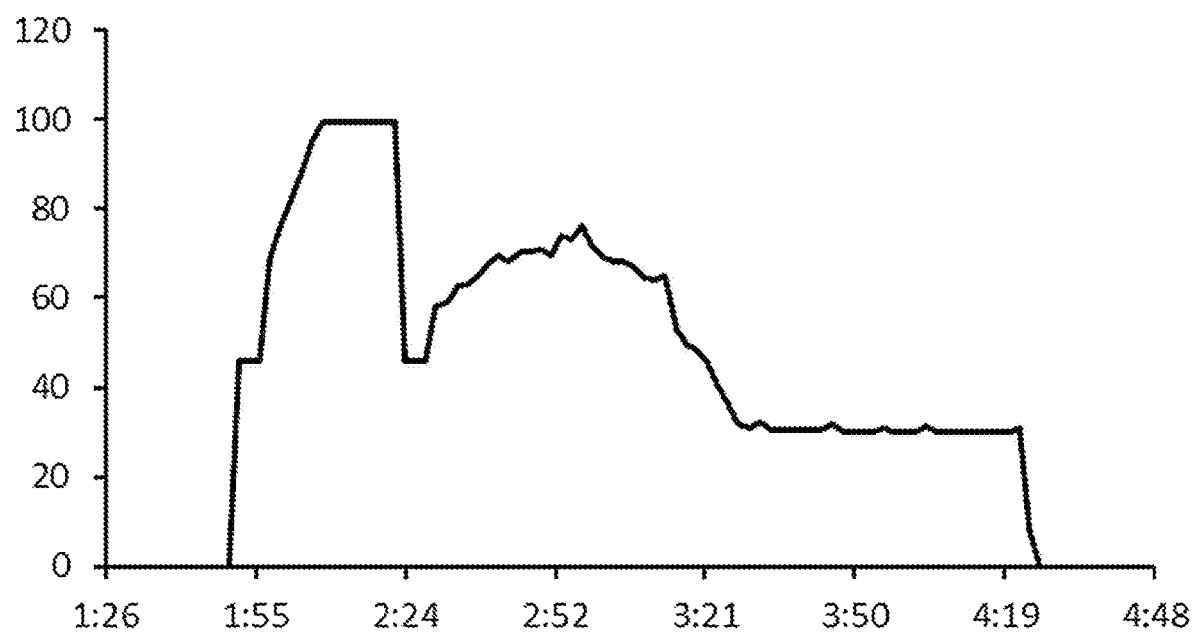
FIG. 5 depicts the capacity of the blowers over the duration of the aerobic phase under control according to the present invention (see Example).

In the process under inventive control, the blower capacity is not set by the oxygen concentration. As can clearly be seen in FIG. 5, first an initial high aeration demand is applied to mix the reactor (the first period in aeration at 100% blower capacity). From there onwards, the increase of $NO_3$ remains about constant. When more simultaneous denitrification occurs, more $NH_4$ is converted to maintain the $NO_3$ increase. The nitrogen from $NH_4$ concentration after mixing was about 12 mg nitrogen per L (FIG. 4). The on-line measurement of the $NH_4$ concentration was updated every 20 minutes, causing a staircase like trend in the graph. The setpoint for target $NO_3$ concentration was initially set at 2 mg nitrogen per L. Every time a $NH_4$ or $NO_3$ measurement became available, a new value for the achievable $NO_3$ concentration after the full aeration phase was estimated (dotted line in FIG. 4). The estimated $NO_3$ end concentration therefore varied with the same rate as those measurements. In the beginning of the aerobic phase, this value was estimated at 7 mg nitrogen per L. This estimated $NO_3$ concentration at the end of aeration is used to determine by interpolation a value for the targeted dynamic $NO_3$ setpoint (large stripped line in FIG. 4), which in turn is used to control the capacity of the aeration (FIG. 5). Based on the simultaneous denitrification rate that was previously achieved within the same reactor, it was estimated that 4 mg/L nitrogen would be converted simultaneously in the next 2 h. So with the starting value of 12 $NH_4$ mg/L, a desired end concentration of 1 mg/L $NH_4$ could be achieved, while converting 7 mg/L to $NO_3$. As can be seen in FIG. 4, the simultaneous denitrification capability during the aeration phase was higher than was estimated at the beginning of the phase and subsequently the estimated final $NO_3$ concentration at the end of the aeration amounts to 5 mg/l, i.e. lower than the estimated concentration at the start of the aeration phase.

Note that the curvature in the $NO_3$ setpoint curve is caused by a decrease in the deviation between the final $NO_3$ estimate during and the $NO_3$ setpoint during progressing of the aeration phase. The controller according to the invention is configured to maintain the actual $NO_x$ concentration close to the setpoint, but at the end of the aeration phase the aeration capacity is at its lowest value and $NO_x$ increases more than the setpoint increases. Consequently, the $NO_x$ is above the actual setpoint and expected end value. When comparing the two aeration patterns in FIGS. 3 and 5, it is concluded that intense aeration is shifted more to the beginning of the aeration phase, such that near the end more simultaneous denitrification capacity is available. Using the controller according to the invention, a reduced $NO_x$ concentration at the end of the aerobic phase is achieved, but an equally low $NH_4$ concentration, when compared to conventional control.

The invention claimed is:

1. A process for controlling an aeration rate during an aerobic phase of a wastewater treatment process:
   wherein nitrification and denitrification occur simultaneously during the aeration of the aerobic phase;
   wherein microorganisms convert $NH_4$ and $O_2$ into $NO_3$ during the aerobic phase;
   wherein the aerobic phase has a selected duration; and
   the process comprises maximizing the amount of the simultaneous denitrification by shifting the balance between the nitrification and the simultaneous denitrification by:
   (a) at moment $t_1$, measuring ammonium concentration $[NH_4^+]_1$ and nitrogen oxide concentration $[NO_x]_1$ in a mixture of wastewater and microbial sludge that is being aerated in the aerobic phase of the waste water treatment;
   (b) determining a nitrogen oxide target concentration $[NO_x]^F_1$ for the end of the aerobic phase based on at least the measured ammonium concentration $[NH_4^+]_1$, the measured $NO_x$ concentration $[NO_x]_1$, remaining time in the aerobic phase, and extent of the simultaneous denitrification available within the remaining time in the aerobic phase;
   (c) determining a setpoint $[NO_x]^{SP}_1$ based on a nitrogen oxide production rate determined by interpolation between $[NO_x]_1$ and $[NO_x]^F_1$, wherein $[NO_x]^{SP}_1$ is defined as $[NO_x]_1$+(nitrogen oxide production rate×$\Delta t$);
   (d) adjusting the aeration rate from 0.1 to 50 $Nm^3$ air per $m^3$ reactor volume per hour to minimise the difference between $[NO_x]_1$ and $[NO_x]^{SP}_1$; and
   (e) repeating steps (a) to (d) at intervals $\Delta t$, wherein $\Delta t$ is at most 60 minutes.

2. The process according to claim 1, wherein the wastewater treatment process is a batch-wise or a continuous wastewater treatment process.

3. The process according to claim 2, wherein the wastewater treatment process is a batch-wise wastewater treatment process.

4. The process according to claim 1, wherein the repeating of step (e) occurs 10-1000000 times during the aerobic phase.

5. The process according to claim 1, wherein measurement (a) is performed by indirect measurement.

6. The process according to claim 5, wherein the measurement comprises measuring the redox potential, conductivity or pH which is translated into the ammonium concentration and nitrogen oxide concentrations.

7. The process according to claim 1, wherein measurement (a) is performed by direct measurement.

8. The process according to claim 7, wherein the measurement comprises measuring the ammonium and nitrogen oxide concentration using a probe capable of determining the concentration based on wet-chemical or physical properties.

9. The process according to claim 1, wherein the aeration rate at the start of the aerobic phase produces an aeration capacity of at least 50% of the installed maximum aeration capacity.

10. The process according to claim 1, wherein step (d) is performed by a controller selected from P-controllers, PI-controllers, PD-controllers, PID-controllers and fuzzy controllers.

11. The process according to claim 1, wherein the aeration rate is varied in the range of 0.1-10 $Nm^3$ $O_2$ per $m^3$ reactor volume per hour.

12. The process according to claim 1, wherein the wastewater treatment process is a granular sludge process or a biofilm wastewater treatment process.

13. The process according to claim 1, wherein aeration is performed by introducing an oxygen-containing gas in a reaction zone comprising the mixture.

14. The process according to claim 1, wherein the process does not comprise a separate anoxic phase.

15. The process according to claim 13, wherein the oxygen-containing gas is air.

16. A process for the treatment of wastewater, comprising:
   (A) contacting wastewater with microbial sludge in a reactor zone;
   (B) aerating the mixture of wastewater and sludge;
   (C) controlling the aeration rate using the process according to claim 1; and
   (D) separating sludge from the treated wastewater.

17. The process according to claim 16, wherein the microbial sludge is granular or in the form of a biofilm.

18. The process according to claim 16, wherein the wastewater is pretreated prior to step (A), by one or more of clarification, grit removal, fat and grease removal, pH-adjustment and pre-sedimentation.

19. The process according to claim 16, which is operated batch-wise or continuously.

20. The process according to claim 19, which is operated batch-wise.

21. The process according to claim 1, which does not comprise anammox treatment.

* * * * *